United States Patent

[11] 3,571,744

[72] Inventors William R. Hook
Los Angeles;
Roland H. Dishington, Pacific Palisades, Calif.
[21] Appl. No. 625,549
[22] Filed Mar. 23, 1967
[45] Patented Mar. 23, 1971
[73] Assignee TRW Inc.
Redando Beach, Calif.

[54] LASERS INCORPORATING TIME VARIABLE REFLECTIVITY
8 Claims, 8 Drawing Figs.

[52] U.S. Cl. .................................................. 331/94.5
[51] Int. Cl. .................................................. H01s 3/00
[50] Field of Search .................................... 331/94.5; 350/150

[56] References Cited
UNITED STATES PATENTS
3,041,936  7/1963  Hull .................................. 350/150
3,055,257  9/1962  Boyd et al. ........................ 331/94.5
3,199,049  8/1965  Morse et al. ...................... 331/94.5
3,229,223  1/1966  Miller ............................... 350/150
3,243,724  3/1966  Vuylsteke ......................... 331/94.5

OTHER REFERENCES

"Laser Cavity Dumping, Using Time Variable Reflectivity" APPLIED PHYSICS LETTERS Vol. 9 #3 Aug. 1, 1966 HOOK, Dishington, and Hilberg "Theory of Laser Regeneration Switching" JOURNAL OF APPLIED PHYSICS Vol. 36 #3 Jun. 1963, A. A. Vuylsteke (2)

Primary Examiner—Ronald L. Wibert
Assistant Examiner—Conrad Clark
Attorneys—Daniel T. Anderson, Alfons Valukonis and Frank E. Wattles ABSTRACT: Lasers in which there is time variable reflectivity of the laser cavity during the lasing process. The time variable reflectivity relates to the variation of the reflectivity in the cavity during the power buildup prior to lasering and during the lasering by varying the voltage at predetermined times to a polarity rotating means within the cavity and which acts to partially or totally effectively remove the reflectivity of one of the substantially 100 percent mirrors at the ends of the cavity.

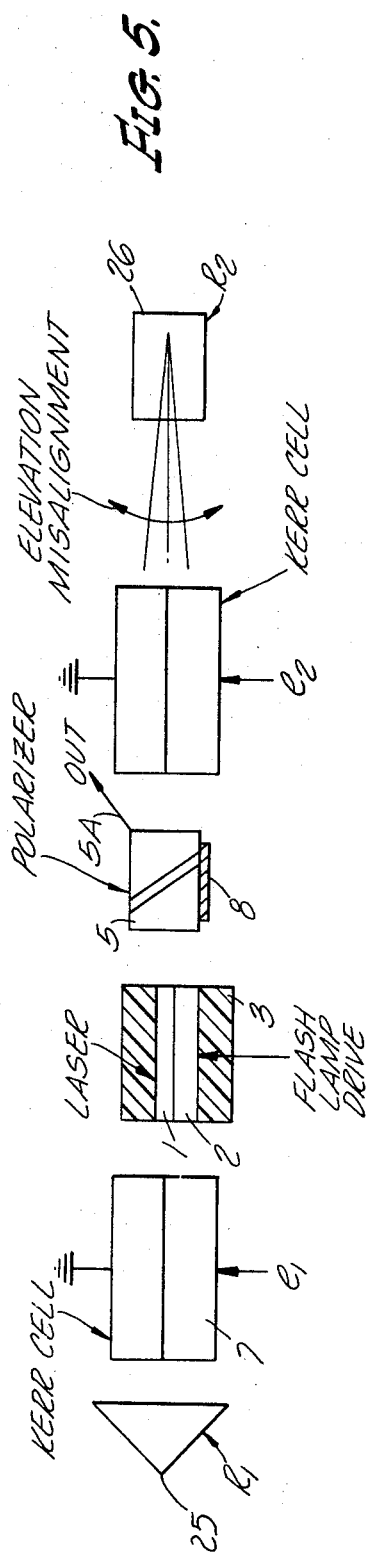
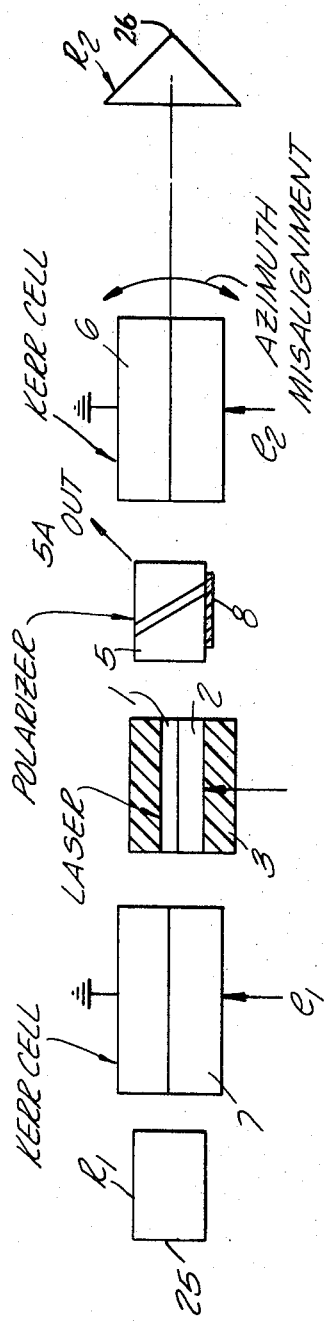

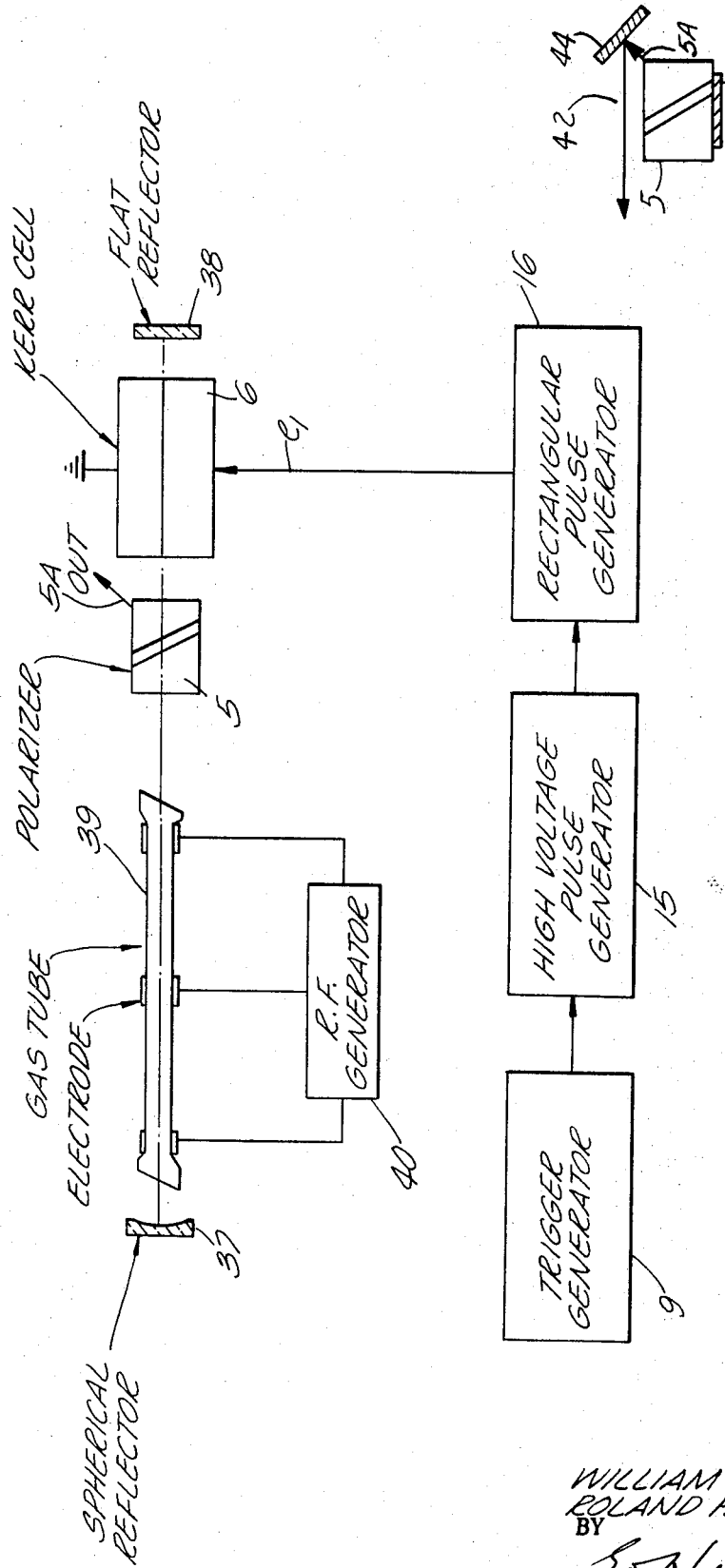

LASERS INCORPORATING TIME VARIABLE REFLECTIVITY

BACKGROUND OF THE INVENTION

Lasers are light-amplifying or light-producing devices and are specifically adapted to provide an output of high-intensity, coherent, monochromatic light. Light is produced in a laser by photonic emission from active atoms or ions of a body composed of a so-called laser material or laser means, occurring incident to the transition of the atoms from an excited upper energy level to a terminal lower energy level. Accordingly, stating it one way, laser operation broadly involves exciting active atoms in the laser body to such an upper energy level, and inducing a coherent emissive transition of the excited atoms to the terminal level to develop a monochromatic high-intensity laser output light pulse.

One form of laser structure includes a rod-shaped body of solid laser material disposed coaxially within a so-called resonant cavity having opposed internally reflective ends of fixed reflectivity. An energy source for exciting atoms to the aforementioned upper energy level is provided by a gaseous discharge flash tube, adapted to emit a pulse of so-called pumping light specifically including light having wavelengths falling within at least one absorption band of the laser material, and arranged so that the pumping pulse is incident on light-transmissive surfaces of the laser body. Upon actuation of the flash tube, the resultant light pulse enters the laser body and photons of energy of appropriate absorptive wavelengths are absorbed by active atoms in the body, causing these atoms to shift from an initial low energy level through a series of inter-level transitions to the upper energy level referred to above and from which emissive transition occurs. Lasering action may take place when the population of atoms thus established at this upper energy level exceeds the population of atoms at the aforesaid terminal level (a condition referred to as an inversion of energy states of the body) and specifically when the degree of inversion obtained in the body is equal to or above a so-called threshold value dependent upon the properties of the particular laser material used and on energy loss factors in the structure.

When this inversion of energy states has been accomplished, individual atoms of the upper level population spontaneously shift to the terminal level with concomitant emission of light of a characteristic laser emissive wavelength determined by the nature of the laser material employed. A portion of the spontaneously emitted light is reflected back and forth through the resonant cavity structure between the internally reflective cavity ends. Since emissive transition of upper level atoms can be induced by light of the laser emissive wavelength, the passage of this spontaneously emitted light through the laser body in multiple bidirectional reflections induces other atoms of the enlarged upper level population to undergo light-emissive transition to the terminal level. The light thereby produced, having the same laser emissive wavelength, augments the bidirectionally reflected light in the cavity to induce still further light-emissive transitions from the upper level population. Thus, a rising pulse of bidirectional reflected light quickly develops in the cavity, reaching a quantitatively large value as the induced emissive transition of atoms from the upper level population becomes massive. If one of the reflective cavity ends is partially transmissive in character, a portion of this large bidirectionally reflected light pulse will pass through the partially transmissive cavity end and out of the cavity to constitute a coherent, highly monochromatic laser output light pulse of the laser emissive wavelength.

In the prior art for the purpose of generating a single, high-power output pulse, there has been developed what is known as the pulsed reflection mode or Q-switching laser operation. For this type of operation, the effective losses in the cavity are regulated, for example, by polarization devices within the cavity which are effective to interrupt the light energy transmission path at predetermined intervals. At approximately the peak of the population inversion, the cavity is conditioned for regenerative action. It is at this time that the cavity is Q-switched, i.e., the losses in the cavity are reduced to a minimum. This allows a single, very large pulse of optical energy to build up in the cavity. Again, the reflectivities of the cavity ends are fixed, and because one of them is partially transmissive in character, a portion of this large bidirectionally reflected light pulse will pass through the partially transmissive cavity end and out of the cavity; it is this energy passing through the partially transmissive cavity end which constitutes the output pulse.

The following are prior U.S. Pat. Nos. 3,027,806 to Koelsch, Jr. et al.; No. 3,215,038 to Heller et al.; No. 3,229,223 to Miller; No. 3,237,011 to Sterzer; No. 3,239,671 to Buhrer; No. 3,242,440 to Koester et al.; and No. 3,243,724 to Vuylsteke. An article by Vuylsteke entitled "An Investigation of Pulsed Modes of Laser Operation" (Part I: Research on a Coherent Electromagnetic Radiation Device Configuration, Technical Documentary Report No. ASD-TDR-63-812 Part I, Oct. 1963) is of interest, stating the problems in the prior art.

In the prior art, conventional Q-switched laser oscillators, designed to generate single high peak power pulses, are limited to pulse lengths of approximately 10 nanoseconds and longer and even such relatively long pulses can be obtained only at an enormous sacrifice of efficiency. For example, fewer than 1 percent of the excited atoms are converted to output photons in a conventional 10 nanosecond Q-switching transmitter. Both the pulse length and the efficiency limitations result from the requirement to keep the power density within the cavity below the damage level. That is, the design of a single-pulse, solid-state laser oscillator is completely dominated by the requirement to keep the power density within the cavity below the damage level.

To achieve a short pulse at reasonable peak power, a conventional Q-switched laser oscillator usually employs an output end mirror in the 20 to 30 percent reflectivity range. With such mirrors the lasting threshold is considerably higher than if both ends had 99 percent or substantially totally reflective mirrors.

SUMMARY OF THE INVENTION

An object of this invention is to generate shorter laser output pulses at increased efficiencies using the time variable reflectivity principle.

Another object of this invention is to allow the absolute minimum lasing threshold to be used, thus lowering the minimum operating level. Where the threshold is lowered to its absolute minumum, the operation level can also be reduced.

It is another object of this invention to provide a self-aligning laser cavity in which the time variable reflectivity principle may be used.

The principles of the present invention can also be applied to gas lasers to achieve a large increase in peak power and to achieve the generation of very short pulses without the requirement for an external modulator.

The time variable reflectivity principle is applied to achieve the foregoing objects of the invention by means of unique use of Kerr cells operated by improved switching means.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

FIG. 5 is a schematic side view of a self-aligning lasing system employing time variable reflectivity;

FIG. 6 is a top view of the system shown in FIG. 5;

FIG. 7 is a schematic view of a gas laser in which the time variable reflectivity principle is used; and FIG. 8 is a showing of a portion of the arrangement of FIG. 1 incorporating alternate means for coupling radiant energy out of the laser cavity.

DESCRIPTION OF THE PREFERRED EMBODIMENTS

Figure 1:
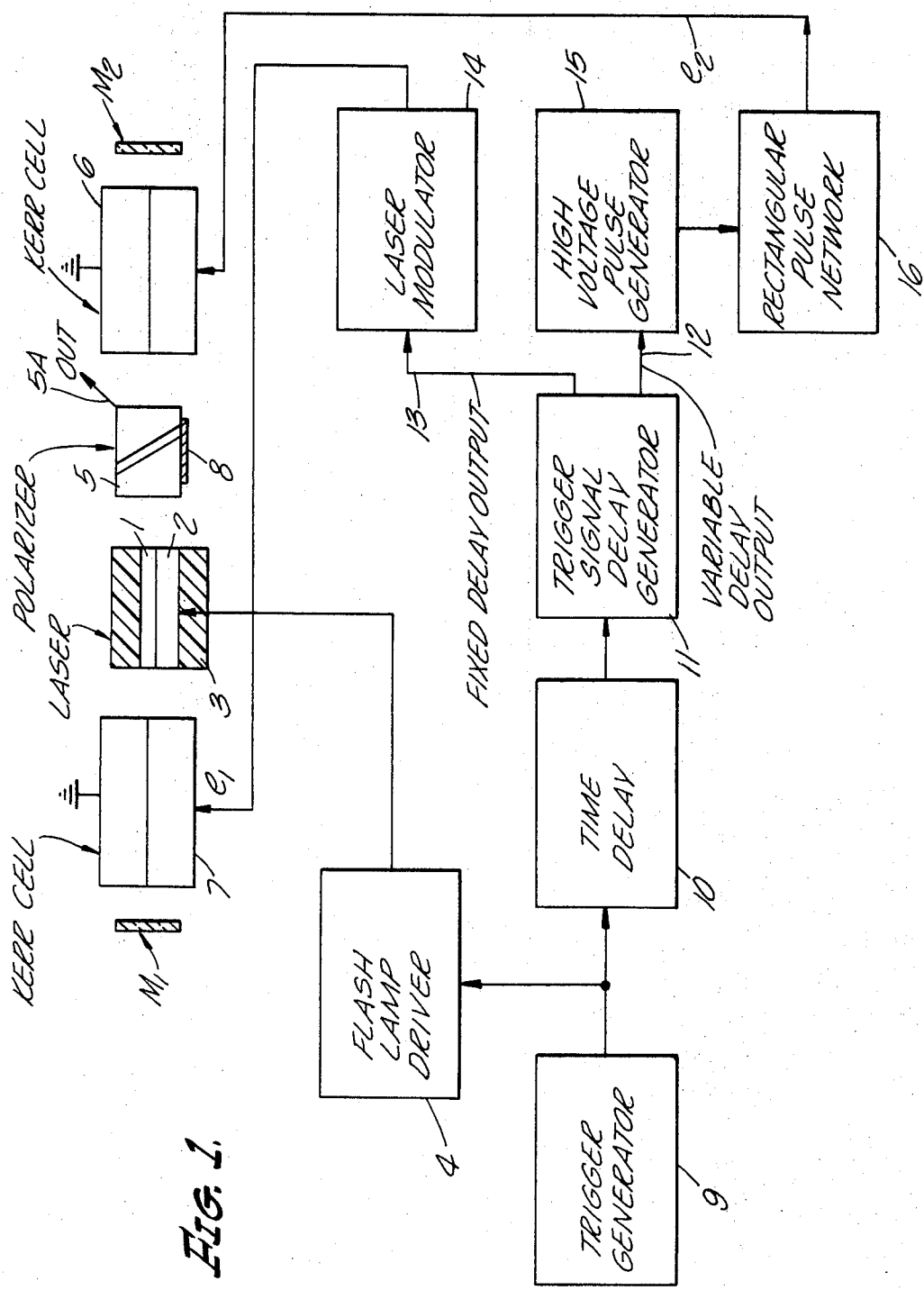
FIG. 1 is a schematic view of a laser arrangement employing the time variable reflectivity principle for short pulse operation.

In FIG. 1, the laser cavity has at its outer ends, approximately 100 percent reflectivity, parallel mirrors $M_1$ and $M_2$. The laser is comprised of a neodymium rod 1 having a diameter, for example, of one-fourth inch and a length of 6 inches. Adjacent to the laser rod is a typical flash lamp 2 and the two are enclosed within an aluminum casing 3, bored to receive the laser rod and flash lamp securely. The opposite ends of the laser rod are directed toward the reflective surfaces of the mirrors, the rod having its longitudinal axis perpendicular thereto. The lamp has a typical flash lamp driver 4 for pumping.

Spaced within the cavity is a Glan polarizer 5 to receive light from the laser rod and the mirrors. The polarizer has a shield 8 on one side which prevents the emission of light from that side. Between the polarizer and the mirror is of 2, there is a Kerr cell 6 and between the laser rod and the mirror $M_1$, there is a second Kerr cell 7. The polarizer and Kerr cells are in axial alignment with the laser rod. The laser cavity between the mirrors has a length of approximately 24''. All of the flat surfaces within the cavity except the mirrors can be antireflection coated.

The circuitry is comprised of a trigger generator 9 which actuates the flash lamp driver 4 to supply power to the flash lamp on the laser to excite the atoms by pumping. The combination of the flash lamp 2 and the driver 4 is a sufficient source of radiant energy to be capable of raising the required number of neodymium ions to the excited energy state. The trigger generator is also connected to energize a time delay 10, a Rutherford Model B14.

A trigger signal delay generator 11, connected to the time delay 10, has a variable delay output 12 and a fixed delay output 13. The variable delay output is connected to a high voltage pulse generator 15 adapted to energize a rectangular pulse network 16 connected to energize the Kerr cell 6 by means of $e_2$. The fixed delay output 13 is connected to a laser modulator 14, an Electro Optical Instrument Model ILM-70.

The laser modulator 14 normally applies a DC voltage to the Kerr cell 7 through $e_1$ but when it is activated by the fixed delay output 13, it reduces this voltage to zero. The fixed delay output 13 is produced by the trigger signal delay generator 11 which in turn is actuated by the time delay 10. The trigger signal delay generator 11 also provides the variable delay output 12 which through the high voltage pulse generator 15 and the rectangular pulse network 16 is capable of applying to the Kerr cell 6 a fast rising step voltage pulse.

For regeneration of the excited atoms in the laser rod 1, the output beam therefrom is confined along its longitudinal axis and is polarized in a direction normal to the axis of the rod. The Kerr cells act as polarization rotators, when energized, and they are effective to rotate the direction of polarization of the polarized radiation from the rod 1 through predetermined angles depending upon the voltage applied at $e_1$ and at $e_2$.

The optical axis of the polarizer 5 is aligned to allow an undeviated transmission of the laser radiation when polarization thereof is unrotated; that is, when there is no voltage on the Kerr cells. Thus, when laser radiation is emitted from the rod, it passes through the inactivated Kerr cells and the polarizer to the mirrors and back and forth. When Kerr cell 7 is energized and Kerr cell 6 is not energized, the path of the polarized laser radiation is controlled by the rotation at Kerr cell 7 such that it is diverted by polarizer 5 into absorber 8. When Kerr cell 7 is not energized and Kerr cell 6 is energized, the path of the polarized laser radiation is controlled by the rotation at Kerr cell 6 such that it is diverted by polarizer 5 in the output direction 5A. The TVR sequence consists of a high cavity loss interval, with Kerr cell 7 energized and Kerr cell 6 not energized; a laser radiation buildup interval, with both Kerr cells 6 and 7 deenergized; and an output or cavity dumping interval with Kerr cell 7 not energized and Kerr cell 6 energized.

Previous to the start of the TVR sequence, the modulator 14 by means of its own power source, not shown, applies the normal DC voltage to the Kerr cell 7 to maintain the high loss situation or to maintain the deconditioning of the rod from radiant energy radiation along its longitudinal axis.

The TVR sequence is begun by energizing the trigger generator 9 which causes the flash lamp driver 4 to energize the lamp 2 so as to start a nonregenerative pumping or irradiating of the atoms within the rod. The number of excited atoms reaches the maximum in a few hundred microseconds. This occurs during the action of the time delay 10 which energizes the trigger signal delay generator 11. After the proper delay has occurred, the maximum number of atoms have been excited and the laser modulator 14 is acted upon by the fixed delay output 13 to reduce the voltage at $e_1$ to the Kerr cell to zero. This establishes a substantial 100 percent reflectivity within the resonant cavity at time $T_0$ of FIGS. 2 and 3, so that conditioning of the cavity and the rod for radiant energy regeneration along the longitudinal axis of the rod occurs and lasing commences and the radiation energy starts to buildup within a frequency range including the characteristic frequency of the lasing atoms in the rod 1. An interval of about 150 nanoseconds occurs before the radiation energy reaches a significant level as indicated at $T_1$ in FIGS. 2 and 3, after which the level rapidly rises to its peak intensity designated at $T_2$. That is, after time $T_1$, photons are emitted from the laser rod 1 and make many traversals within the cavity through the rod and between the mirrors, passing through the Kerr cells and the polarizer without deviation.

Figure 2:
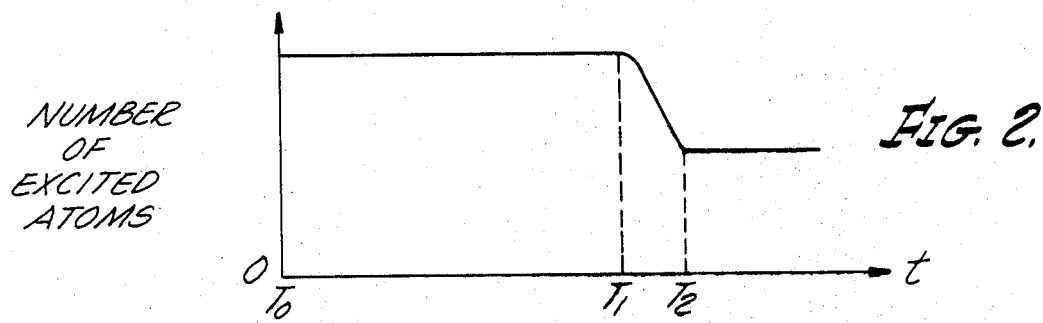
FIG. 2 is a plot of the number of excited atoms at any time in the laser cycle.
Figure 3:
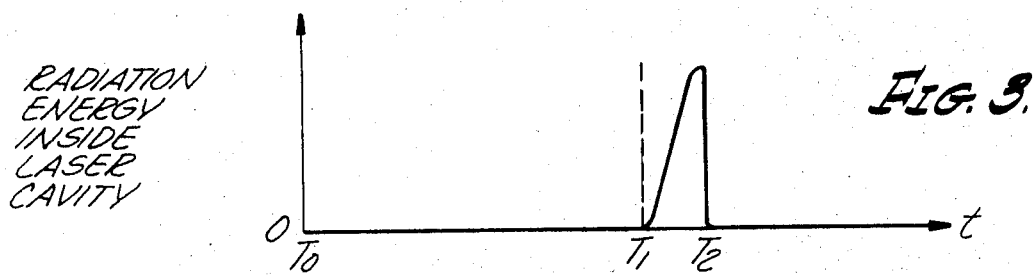
FIG. 3 is a plot illustrating the radiation energy level inside the laser cavity as it changes with time.

As the radiation energy builds up between $T_1$ and $T_2$ in FIG. 3, the population of excited atoms rapidly decreases between $T_1$ and $T_2$, as shown in FIG. 2. The time between $T_0$ and $T_2$ is approximately 200 nanoseconds. At the predetermined time when the peak at $T_2$ is reached, the variable delay output 12 energizes the high voltage pulse generator 15 which in turn energizes the rectangular pulse network 16 to produce a rectangular or step pulse to supply a voltage $e_2$ to the Kerr cell 6 at a very high speed. The voltage applied to the Kerr cell 6 rotates the polarity to rotate the direction of polarization of the beam from the laser rod and so as to discharge the radiation energy out through the polarizer at 5A. This causes the radiation energy within the cavity, as indicated in FIG. 3, to drop to zero at $T_2$ in a time, for example, between 3 and 5 nanoseconds depending upon the length of the cavity. This latter step is called cavity dumping. The rectangular pulse network 16 produces a single pulse and after the pulse has rotated the beam out of the cavity, voltage to the Kerr cell 6 returns to zero to complete the lasing cycle.

During the period that the Kerr cell 6 is activated by the applied voltage, the cavity has had its reflectivity removed or minimized in the same manner as if one of the mirrors had been pulled away at a very rapid pace. Thus, the discharge of the short pulse at 5A is produced in accordance with the principle of time varied reflectively. As indicated in FIG. 2 at $T_2$ the number of excited atoms is substantially decreased but not totally decreased.

It is the time variable reflectivity principle made possible by the circuitry shown in FIG. 1, as well as the use of two Kerr cells within the cavity which permits the radiation energy to be discharged at its peak in a very short pulse. In the embodiment shown in FIG. 1, it is desired that the cavity dumping be actuated at the intensity peak of the pulse, and thus, the variable delay interval should be held to within a few nanoseconds of the actual cavity buildup time $T - T_0$ which is typically greater than 100 nanoseconds. If the laser is to be operated repetitively, the variable delay interval can be held to within a few nanoseconds of the desired value by observing time $T_2 - T_0$ in FIG. 3, using an oscilloscope and a photodiode and inserting the proper time delay to the trigger signal delay generator 11. This process can be made automatic with the circuitry illustrated in FIG. 4.

Figure 4:
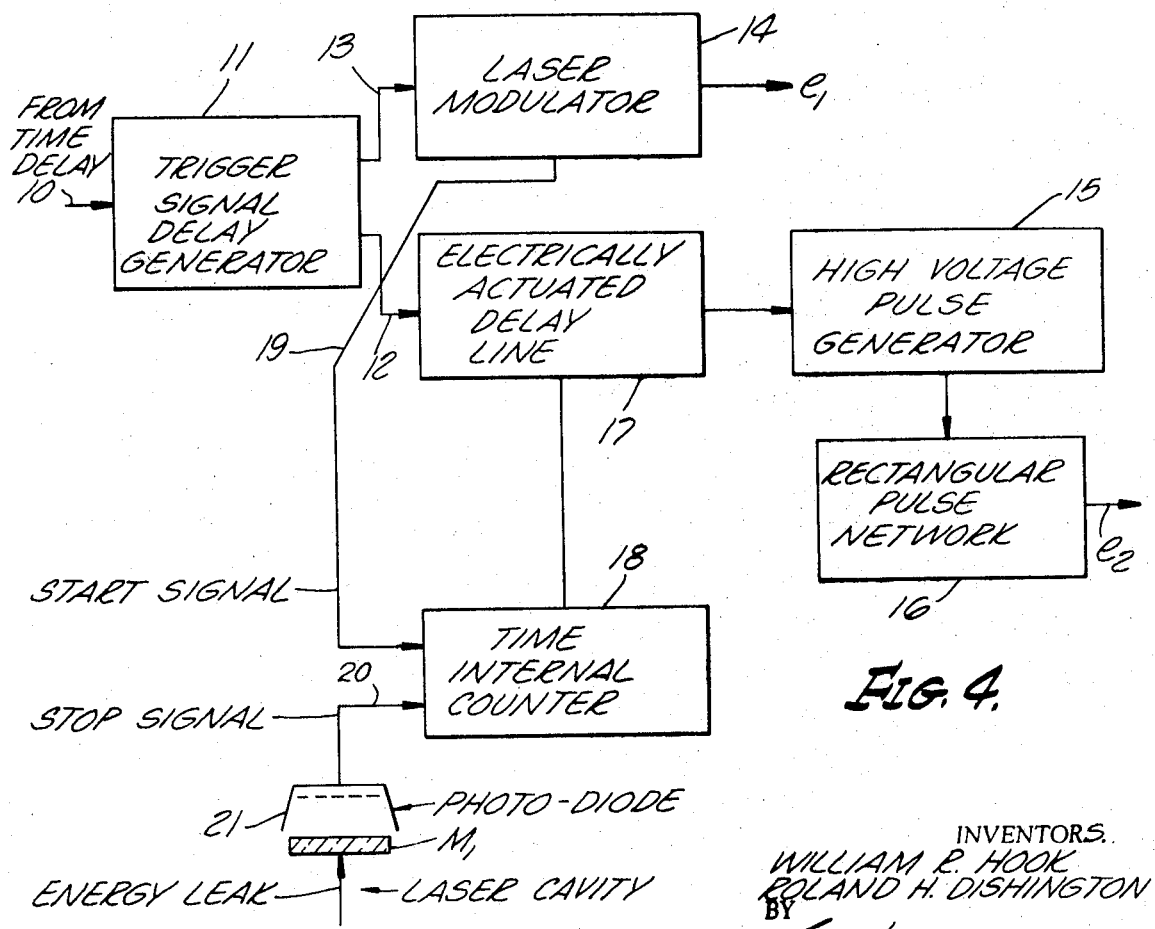
FIG. 4 is a block diagram of a means for synchronizing cavity dumping with the peak of the Q-switched pulse.

In FIG. 4 there is a modified version of the circuitry of FIG. 1, the unshown trigger generator 9, the flash lamp driver 4 and the time delay 10 being the same as in the latter. An electrically actuated delay line 17 has been inserted between the trigger signal delay generator 11 and the high voltage pulse generator 15. Such a delay line can be easily fabricated by using solenoid actuated coaxial switches and different lengths of coaxial cable, where the lengths of the cables are selected to give a binary series of time delays as: 2 ns., 4 ns., 8 ns., etc. The amount of delay to be inserted is controlled by a time interval counter 18, such as the Eldorado Electronics model 793, for example. The function of the time interval counter is to measure the interval of $T_2 - T_0$, and to automatically insert the time delay into the system. The counter is started by a pulse or start signal 19 derived from the Q-switching laser modulator 14 and is stopped by the arrival of the Q-switched pulse itself, sensed by monitoring some of the power leaking through one of the end mirrors, as $M_1$, using a photodiode 21, such as the ITT F-4000 to form stop signal 20. When the stop signal stops the counter 18, the counter 18 has stored within it the measured time interval $T_2 - T_0$ for the activating pulse. This time interval $T_2 - T_0$ is used to set electrically actuated delay line 17. Thus, this device measures the time interval $T_2 - T_0$ for one lasing cycle, and inserts that interval into the system to be used to dump the cavity at the proper time on the next lasing cycle, the dumping occurring by the application of the voltage to the Kerr cell 6.

In many laser applications, the alignment of the cavity end mirrors is a serious practical problem, both because it is necessary to provide a relatively complicated mechanism to allow the angular adjustment to be made and because it is necessary that the angular adjustment, once made, be held very accurately for long periods of time and under extreme environmental conditions. The better the optical quality of the laser rod the more of a problem this becomes. With a neodymium laser rod, for example, this is a very serious problem since these rods are optically perfect and hence normally operate close to the diffraction limit.

Previously this problem has been partially solved by employing a roof prism on one end of the cavity. This made the cavity self-aligning in one axis but the problems described above remained for the other axis.

The previously shown time variable reflective type of transmitter has used 99 or 100 percent mirrors at both ends of the cavity. In the embodiments shown in FIGS. 5 and 6, where within the cavity there are the same elements as in FIG. 1, there are roof prisms $R_1$ and $R_2$ at opposite ends of the cavity in place of mirrors. The prism knife edges 25 and 26 are aligned at 90° with respect to each other. The left-hand prism $R_1$ is self-aligning with respect to elevation angle misalignment of the right-hand prism $R_2$. The right-hand prism $R_2$ is self-aligning with respect to azimuth angle misalignment of the $R_1$ prism. Thus, the cavity is self-aligning in both angular directions. As with the previously shown time variable reflective activated cavity, the energy is extracted out of the side through the polarizer.

Gas lasers have certain advantages. In regard to spatial coherence they almost always operate in a diffraction-limited mode. Typical gas lasers operate in only one two or three frequency modes and it is relatively easy to cause them to operate in only one frequency mode if desired. Argon lasers operate in the blue-green region, which is the spectral region of maximum detector sensitivity. Gas lasers can be operated either continuously or at high repetition rates, and therefore, it is possible to employ them in systems where it is desired to employ continuous viewing, or where a high data rate is required for other reasons.

The disadvantage of gas lasers as they have been operated in the past is that it is difficult to achieve very short pulses and the peak power output is limited by the requirement to use high reflectivity mirrors. For example, an argon laser operating with a 100 percent mirror at one end and a 95 percent mirror at the other end achieves a peak power output which is only 5 percent of the peak power existing with the cavity. The output of a typical helium-neon laser is only about 1 percent of the peak power within the cavity. The peak power within a gas laser is limited by damage effects within the cavity and more particularly within the plasma tube, the saturation of available atoms, and the limitations of the power supply.

In the prior art, the ability to achieve very short pulses from gas lasers is almost entirely related to the technology of external modulators. There has been no technique comparable to Q-switching for a gas laser, where a fast rise time step function could be used to create a fast output pulse via dynamic effects within the cavity.

According to the invention, by means of time variable reflectivity within the gas laser, very short pulses having greatly increased peak power are achieved.

In FIG. 7, there is shown a gas laser having an approximate 100 percent spherical reflector 37 at one end of the cavity and an approximate 100 percent flat reflector 38 at the other end of the cavity. A gas tube 39, axially aligned with the reflectors, is the laser and it is energized to excite the gas atoms therein by means of a radio frequency generator 40. Also axially aligned with the laser in the cavity is a Glan type polarizer 5 and a Kerr cell 6. Coupled to the Kerr cell through $e_1$ are a trigger generator 9, a high voltage pulse generator 15 and a rectangular pulse generator 16.

In FIG. 7, the rotation of the polarity in the Kerr cell is effective to cause energy within the cavity to be diverted out of the cavity at point 5A via the polarizer 5. In operation the gas laser is operated in its normal mode, with no voltage applied to the Kerr cell, and whenever an output pulse is desired a voltage pulse with a fast rise time is applied to the Kerr cell by means of the trigger generator 9, the high voltage pulse generator 15, and the rectangular pulse generator 16. This causes the optical energy stored within the cavity to flow out at the speed of light. The output pulse at 5A has a peak power substantially equal to the peak power existing in the cavity and has a pulse length related to the length of the cavity. Thus, in FIG. 7, the output end mirror typically found in an ordinary gas laser has been replaced with the components which permit operation in the time variable reflection mode, the components for the latter being the polarizer, the Kerr cell and the flat approximately 100 percent reflective mirror.

The employment of the concept of time variable reflectivity in gas lasers will find uses in high speed holography, high speed contour mapping, direct view contour mapping, and in other applications where very short and relatively high peak power pulses, having the spatial and spectral purity of gas laser radiation, are required. The application of the present invention allows a large increase in peak power for any gas laser and allows the generation of very short pulses without the requirement for an external modulator. In particular, when a very short output pulse is desired, the use of this technique avoids the requirement for having to generate an external modulator voltage pulse which has the desired pulse width. With the present technique it is only necessary that the pulse applied to the internal modulator, that is, the Kerr cell, have a fast rise time.

The time variable reflectivity techniques described here for the gas laser apply equally well to solid lasers operating in the continuous wave mode. Reference is made to FIG. 8. It will be readily appreciated that radiation can be coupled out of the laser cavity along a direction 42 corresponding to the longitudinal axis of the rod 1 of FIG. 1 simply by means of a beam direction changing element, such as a plane mirror 44, or the like, suitably positioned with respect to the polarizer 5, as shown in FIG. 8. Obviously the devices of FIGS. 5 and 6 can be similarly altered to provide the desired beam direction.

The invention and its attendant advantages will be understood from the foregoing description and it will be apparent that various changes may be made in the form, construction and arrangement of the parts of the invention without departing from the spirit and scope thereof or sacrificing its material advantages the arrangement hereinbefore described being merely by way of example. We do not wish to be restricted to the specific form shown or uses mentioned except as defined in the accompanying claims, wherein various portions have been separated for clarity of reading and not for emphasis.

We claim:
1. In combination comprising:
   a laser cavity;
   substantially total reflection members at the ends of said laser cavity for providing substantially total reflection of light energy therefrom into said cavity;
   laser means disposed in said cavity for emitting light energy in a direction to be reflected by said reflection members;
   a radiant energy source adjacent said laser means for pumping said laser means when energized to establish an operational condition of excited atoms in excess of the threshold level for oscillatory lasing action of coherent light energy within said cavity;
   polarizer means within said cavity for permitting passage of light energy having an unrotated direction of polarization therethrough to said reflection members to achieve light energy amplification, and for diverting light energy having a rotated direction of polarization to reduce reflectivity within said cavity, and light energy having an other another rotated direction of polarization to discharge from said cavity;
   a pair of cells within said cavity for permitting passage of light energy having an unrotated direction of polarization therethrough to said reflection members when deenergized, and for rotating the polarization direction of said light energy to said rotated polarization directions when electrically energized, said cells being located on opposite sides of said polarizer means; and
   means for energizing said radiant energy source and for energizing and deenergizing said cells in a predetermined sequence to establish said condition of excited atoms and reduced reflectivity within said cavity, to achieve said light energy amplification, and to discharge said light energy at its peak amplified value from said cavity.

2. The combination according to claim 1 in which said reflection members are two roof prisms, one at each end of said cavity, said prisms having their respective longest sides facing said cavity and having their respective knife edges aligned at 90° with respect to each other whereby one of said prisms is self-aligning with respect to any elevation angle misalignment of said other prism and said other prism is self-aligning with respect to any azimuth angle misalignment of said one prism so as to make such cavity self-aligning in both angular directions.

3. The combination according to claim 1 wherein said cells are Kerr cells.

4. The combination according to claim 1 wherein said energizing means comprises:
   a trigger generator for generating a trigger signal;
   a power source connected to said trigger generator and said radiant energy source for supplying power to pump said laser means in response to said trigger signal;
   signal generator means connected to said trigger generator for generating fixed and variable delay output signals in response to said trigger signal;
   a voltage source connected to one of said cells and said signal generator means for normally applying a voltage to said one cell to rotate the polarization direction of said light energy to said one rotated direction of polarization to divert said light energy to reduce reflectivity within said cavity while said laser means is pumped, and for removing said voltage applied to said one cell to achieve light energy amplification in said cavity in response to said fixed delay output signal; and
   another voltage source connected to said other cell and said signal generator means for normally applying no voltage to said other cell while said laser means is pumped to achieve light energy amplification, and for applying a voltage to said other cell to rotate the polarization direction of said light energy to said other rotated direction of polarization to discharge said light energy at its peak amplified value from said cavity in response to said variable delay output signal.

5. The combination of claim 4 wherein said signal generator means comprises:
   time delay means responsive to said trigger signal for generating an output; and
   a trigger signal delay generator connected to said time delay means for generating said fixed and variable delay output signals in response to said time delay means output.

6. The combination according to claim 4 wherein said voltage source connected to said one cell comprises a laser modulator.

7. The combination according to claim 4 wherein said voltage source connected to said other cell comprises:
   a high voltage pulse generator for generating an output in response to said variable delay output signal; and
   a rectangular pulse generator network connected to said high voltage pulse generator for generating said voltage applied to said other cell in response to said high voltage pulse generator output, said applied voltage being a fast rising step voltage pulse.

8. The combination according to claim 1 wherein said energizing means comprises:
   a trigger generator for generating a trigger signal;
   a power source connected to said trigger generator and said radiant energy source for supplying power to pump said laser means in response to said trigger signal;
   signal generator means connected to said trigger generator for generating fixed and variable delay output signals in response to said trigger signal;
   a voltage source connected to one of said cells and said signal generator means for normally applying a voltage to said one cell to rotate the polarization direction of said light energy to said one rotated direction of polarization to divert said light energy to reduce reflectivity within said cavity while said laser means is pumped, and for removing said voltage applied to said one cell to achieve light energy amplification in said cavity in response to said fixed delay output signal, said voltage source providing a start signal when said laser means is pumped;
   delay line means connected to said signal generator means for providing time delay to said variable delay output signal in response to an electrical signal;
   another voltage source connected to said other cell and said delay line means for normally applying not voltage to said other cell while said laser means is pumped to achieve light energy amplification, and for applying a voltage to said other cell to rotate the polarization direction of said light energy at its peak amplified value from said cavity in response to said variable delay output signal;
   photodiode means positioned adjacent one of said reflection members for generating a stop signal in response to said light energy leaked through said one reflection member at its peak amplified value in said cavity; and
   time interval counter means connected to said diode means, said one voltage source, and said delay line means for generating said electrical signal in response to said start and stop signals which is a measure of the time interval between the pumping of said laser means and the achieving of said light energy amplification.